Feb. 17, 1959 R. T. CATLIN ET AL 2,873,447
CARTRIDGE-OPERATED STAPLE-DRIVING TOOL
Filed April 5, 1956 4 Sheets-Sheet 1
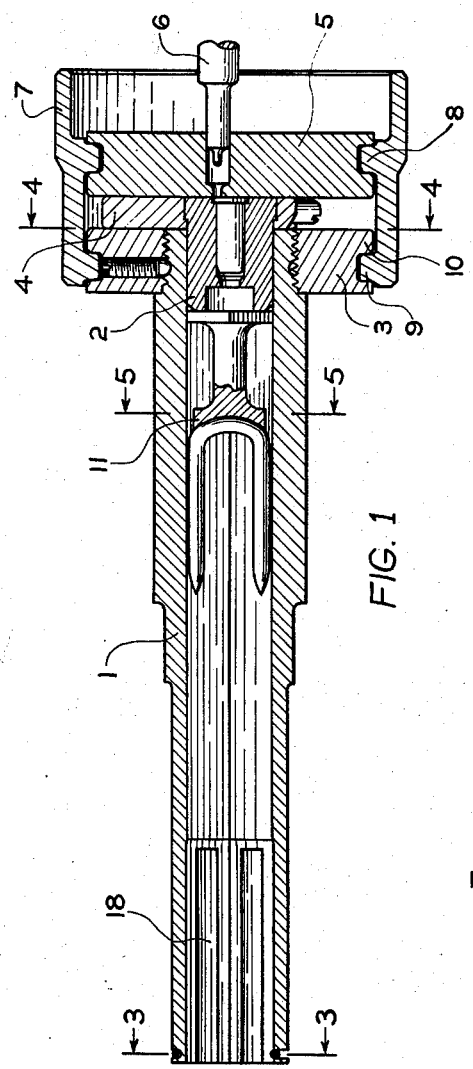
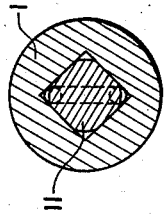
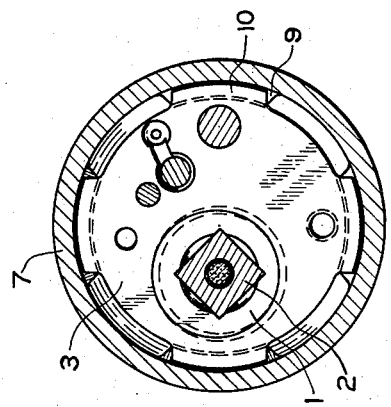
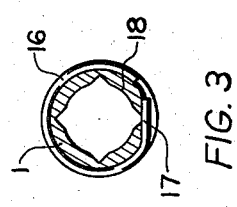
INVENTORS
ROBERT T. CATLIN
ARTHUR J. LANDA
BY Feb. 17, 1959  R. T. CATLIN ET AL  2,873,447
CARTRIDGE-OPERATED STAPLE-DRIVING TOOL
Filed April 5, 1956  4 Sheets-Sheet 2
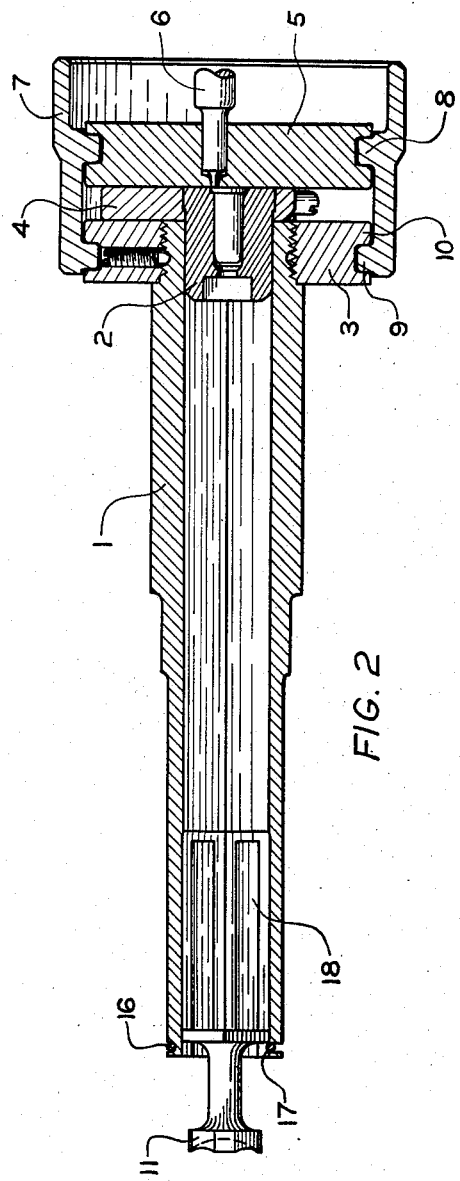
FIG. 2
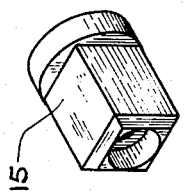
FIG. 7
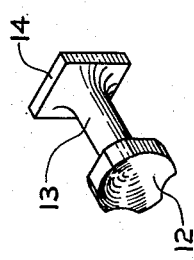
FIG. 6
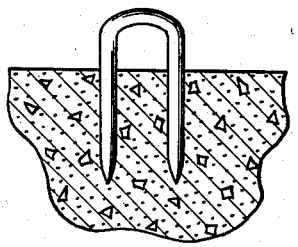
*INVENTORS*
ROBERT T. CATLIN
ARTHUR J. LANDA
BY Feb. 17, 1959   R. T. CATLIN ET AL   2,873,447
CARTRIDGE-OPERATED STAPLE-DRIVING TOOL
Filed April 5, 1956   4 Sheets-Sheet 3

INVENTORS
ROBERT T. CATLIN
ARTHUR J. LANDA
BY

Feb. 17, 1959 R. T. CATLIN ET AL 2,873,447
CARTRIDGE-OPERATED STAPLE-DRIVING TOOL
Filed April 5, 1956 4 Sheets-Sheet 4

FASTENING METAL RACEWAYS TO CONCRETE OR STEEL

WIRE TIE EYE TO STEEL OR CONCRETE

FASTENING LUMBER TO STEEL OR CONCRETE

INVENTORS
ROBERT T. CATLIN
ARTHUR J. LANDA
BY

United States Patent Office 2,873,447
Patented Feb. 17, 1959

2,873,447
CARTRIDGE-OPERATED STAPLE-DRIVING TOOL

Robert T. Catlin, Trumbull, and Arthur J. Landa, Huntington, Conn., assignors to Remington Arms Company, Inc., Bridgeport, Conn., a corporation of Delaware Application April 5, 1956, Serial No. 576,456

9 Claims. (Cl. 1—44.5)

This invention relates to tools for driving fastening devices with the power derived from an explosive cartridge, and has particular reference to such a tool for the driving of staples.

Previous attempts to drive staples with cartridge powered tools depended upon the use of a barrel having a bore of narrow rectangular cross-section with slightly rounded ends closely fitting the staple. A barrel of this form is shown in the co-pending application of Merle H. Walker, Newton M. Reed and Robert T. Catlin, Serial No. 517,192, filed June 22, 1955, and entitled "Powder Actuated Tool." Without a special gas seal secured to the head of the staple, gas pressure acting on the staple in such a barrel tends to collapse the legs inwardly while the staple is traveling down the bore of the tool, resulting in poor stapling and permitting excessive gas leakage. A number of gas seal designs have been evaluated but those which were effective were comparatively expensive. It is the object of this invention to produce a tool for effectively driving staples of substantially conventional shape into steel, concrete, mortar or other penetration-resistant materials.

A further object is to produce such a tool which does not require the use of special gas seals or other expensive components which are not re-usable.

Among the additional objects of our invention are the provision of a design which may be used efficiently and economically and with a minimum of opportunity for losing or mislaying components which must be handled in the loading operation.

As an incident to the study of the tool we have investigated staple designs and have developed designs which are particularly effective for use both in steel and in concrete.

The present invention contemplates the use of a barrel having a bore of square cross section with the staple legs positioned in and guided by diagonally opposite corners of the barrel bore. A re-usable driving piston is provided and may have a portion of square cross section closely fitting the square barrel to serve as a gas seal. The staple engaging face of the piston may be formed with a concave shape matching the curvature of the head of the staple.

The exact nature of the invention, as well as other objects and advantages thereof, will become apparent from consideration of the following specification, referring to the attached drawing, in which:

Fig. 1 is a longitudinal cross-sectional view through a barrel loaded and ready for the driving of a staple.

Fig. 2 is a view similar to Fig. 1, showing the tool being lifted away from a driven staple.

Fig. 3 is a cross-sectional view on the plane of the line 3—3 of Fig. 1.

Fig. 4 is a cross-sectional view on the plane on the line 4—4 of Fig. 1.

Fig. 5 is a cross-sectional view in the plane of the line 5—5 of Fig. 1.

Fig. 6 is a pictorial view of the driving piston.

Fig. 7 is a pictorial view of a chamber bushing.

Figures 8, 9, 10, 11, 12:
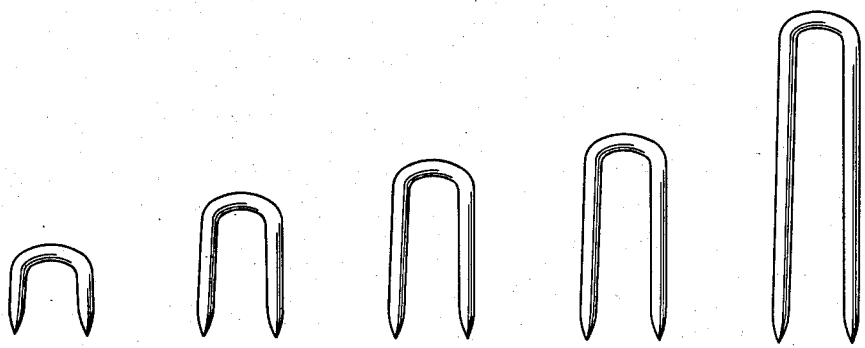
Figs. 8, 9, 10, 11 and 12, are elevational views of a series of staples of the preferred form in different sizes.
Figure 13:
Figure 14:
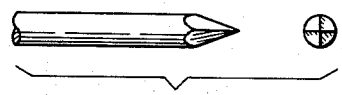
Figure 15:

Figs. 13, 14 and 15, each include a side and an end elevation of alternative point forms for staples.

Figure 16:

Fig. 16 is a side elevational view of a staple formed with a self-clinching point.

Figure 17:
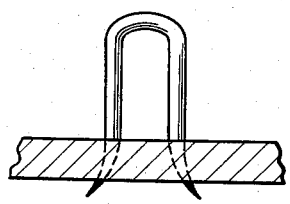

Fig. 17 is a similar view, partially in section, showing the result of driving such a staple.

Figure 18:
Figure 19:
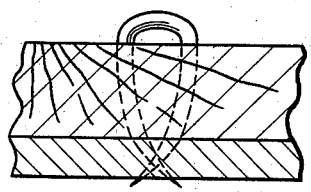

Figs. 18 and 19 correspond respectively to Figs. 16 and 17 and illustrate another example of self-clinching staple.

Figure 20:
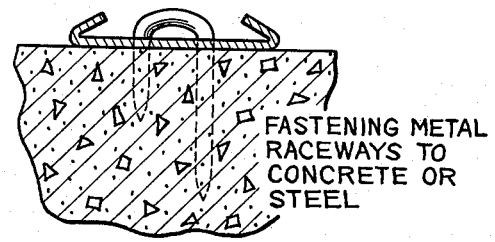
Figure 21:
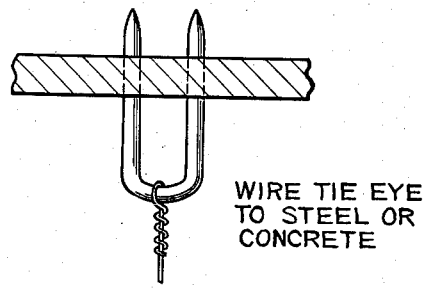
Figure 22:
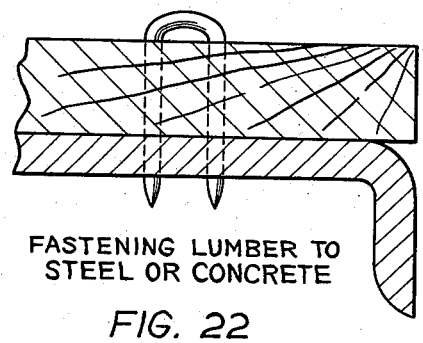

Figs. 20 thru 22 are side elevational views, partially in section, illustrating other examples of staple driving applications.

Referring to the drawings by characters of reference, it will be seen that we have provided a barrel 1 adapted for use in a stud driver such as that shown in the co-pending application referred to above but also capable of use in any other stud driver capable of supporting the barrel 1 and chamber bushing 2 in proper relationship to each other and safely confining and firing a cartridge in the chamber bushing. For simplicity, we have here illustrated only the absolutely essential elements, such refinements as safety devices, guards and the like, being omitted.

In the construction shown, the barrel 1 is threadably attached to a frame plate 3 and a chamber plate 4 is provided to support the chamber bushing 2, the principal function of the chamber plate being outlined in the co-pending application referred to above as that of holding the chamber bushing during the loading cycle. The breech plate 5 fits against the rear face of the chamber plate and supports the firing mechanism, here indicated only by a firing pin 6. A locking sleeve 7 encircles the three plates referred to and is provided with lugs 8 engaging lugs on the breech plate and with interrupted locking lugs 9 which can be brought into engagement with similar lugs 10 on the frame plate to securely lock the breech mechanism in cartridge confining relationship.

The chamber busing 2 (see Fig. 7) is in function and interior construction identical to that disclosed in United States Letters Patent No. 2,759,185 granted August 21, 1956, on a co-pending application of Robert T. Catlin et al., Serial No. 517,524, filed June 23, 1955, and entitled "Chamber Bushing for Stud Driver," serving to support the cartridge and insure regularity and uniformity in the combustion of the charge therein.

The construction described thus far is that of the significant elements of the co-pending application of Walker et al. referred to above but it must be understood that the present invention may be utilized with the breech closures and safety devices of other types of stud drivers, for example, that shown in United States Letters Patent No. 2,768,375 granted October 30, 1956, on a co-pending application of Robert T. Catlin, Serial No. 526,405, filed August 4, 1955, and entitled "Cartridge Powered Tool."

The barrel 1 is formed with a bore of square cross-section, conveniently one-half inch on a side, and the staples to be used therein are of such dimensions as to fit diagonally across the square bore with the legs of the staples guided in the corners thereof. A driving piston 11 (see Fig. 6) is provided with a concave forward face 12 which substantially matches the curvature of the head of the staple to uniformly apply pressure thereto. For light weight, the driving piston may conveniently to formed with a neck 13 of reduced diameter joining the head 14 which is of square cross section matching that of the bore of the barrel. It is desirable to elongate the piston in this way to separate the portions bearing on the barrel and insure stability in passing through the barrel. The forward end of the piston on which the face 12 is formed preferably does not fit the barrel closely and may be of circular cross section having only tangential contact with the sides of the barrel or may be of rectangular cross section with the corners rounded off or cut-out (see Fig. 5).

The chamber bushing 2 (see Fig. 7), previously referred to, has its forward end 15 formed in square cross section to be received in the bore of the barrel so that the gases generated by the firing of the cartridge may be directly applied to the propulsion of the piston and, through the piston, to the propulsion of the staple.

At the muzzle end of the barrel, we have provided on the exterior surface of the barrel an annular groove which is cut through to intersect one of the corners of the square bore. A ring 16 is formed with a detent 17 passing chord-wise across the corner of the square bore. The detent 17 does not extend far enough to engage the forward end of the piston 11 which as noted does not engage the corners of the barrel. The square head 14 of the piston will however be engaged by the detent to releasably retain the piston in the bore as the barrel is lifted away from a work surface into which a staple has been driven, as illustrated in Fig. 2.

To insure that the piston 11 will drop down against the detent, the muzzle end of the bore is enlarged by a few thousandths of an inch on each side for a distance of about two inches from the muzzle. The muzzle end of the barrel is also provided with gas vents bypassing the piston by means of a circular counterbore of slightly larger diameter than the sides of the square bore so that an arcuate cut 18 is made in each of the flat surfaces of the barrel bore for a distance of about two inches back from the muzzle. Both the detent ring and the gas vent cuts are shown in the cross-sectional view, Fig. 3.

The staples utilized are of generally conventional shape, but for use in concrete, steel or other penetration resistant material, are preferably formed from a strong heat treatable steel such as SAE 4037, hardened to a degree sufficient to penetrate without substantial deformation and without breakage. Where desirable, corrosion resistant platings or coatings may be employed. Preferably, such staples will be made available in a variety of lengths, differing substantially only in length and all having the legs so spaced as to permit ready insertion into the square bore without difficulty but having sufficient frictional engagement with the walls thereof to insure that the staples will retain any pre-set position in the bore. Such a family of staples of different lengths is shown in Figs. 8 through 12.

It will be noted that the preferred staples shown in Figs. 8 through 12 are characterized by uniform ogival points similar to those utilized on explosively driven studs, such points having been found to provide the best and most consistent results in all materials where straight driving is desired. The point forms shown in Figs. 13, 14 and 15, have all been found to be reasonably satisfactory for driving into concrete or mortar, but these shapes are not nearly as efficient for fastening to steel as the ogival points.

The chisel shaped points obtained by straight flat diagonal cuts through the staple legs at a shallow oblique angle impart a tendency toward curved penetration which is useful for certain applications, such as fastening wood to thin gauge steel, where the cross clenching or outward spreading of the staple points effects a material enhancement of holding power. Fig. 16 illustrates such a staple, and Fig. 17 illustrates the results of driving it. Fig. 18 illustrates a similar staple cut on the other diagonal, and Fig. 19 illustrates the result of driving it.

Figs. 20 through 22 illustrate typical applications of explosively driven staples with ogival points, and the legends under each figure are believed to be self-explanatory.

Summary of operation

In considering the operation of our staple driver, it is convenient to start with the parts in the condition shown in Fig. 2, assuming a staple has just been driven and that it is desired to reload and drive another staple. It will be noted that the piston 11 protrudes from the muzzle of the barrel, being releasably retained in that position by the detent finger 17.

The breech mechanism may then be unlocked by the rotation of the locking sleeve, or whatever other locking means is provided, and the breech plate, frame plate and chamber plate separated, to expose the breech end of the barrel and the chamber bushing. The fired cartridge is ejected from the chamber bushing, and the tool is in readiness for a next fastening job.

A staple of the desired length is manually inserted in the barrel with the legs of the staple guided by the corners of the bore, and the piston 11 which has been supported at the muzzle of the barrel is detached therefrom and inserted into the breech of the barrel, the concave face 12 engaging the head of the staple and pushing it further into the barrel. A loaded cartridge of the desired power is then loaded into the chamber bushing 2 and the breech mechanism locked. In the closing of the breech mechanism the chamber bushing is inserted a short way into the barrel and the piston and staple are moved thereby to their final position in readiness for firing of the cartridge.

When the cartridge is fired by the impact of the firing pin 6 upon the primed portion thereof, the piston 11 and the staple are forcibly propelled down the barrel to seat the staple in the work surface opposed thereto. The legs of the staples are well guided by the corners of the bore, and the matching fit afforded by the concave face 12 with the head of the staple insures that there will be no distortion thereof by the driving force employed. As a result, staples can be well and cleanly driven into any material adapted to receive the conventional driven stud.

The enlargement of the bore at the muzzle insures that when the tool is lifted from the work surface the piston will drop to engagement with the detent finger where it may be readily grasped for reloading. The gas vent cuts permit the powder gases to by-pass the piston and escape at the muzzle of the barrel.

Although we have shown our invention applied to only one embodiment of commercial stud driver, it should be obvious that it may be applied with equal facility to any other stud driver. Similarly, it should be obvious that modifications can be made in the constructions illustrated without departing from the spirit of the invention. Accordingly, the invention should not be construed as limited by the details of the disclosure herein but only by the scope of the claims appended hereto.

What is claimed is:

1. A tool for driving staple-type fastening devices with the power derived from an explosive cartridge comprising in combination a barrel having a bore, a breech end in which the explosive cartridge is exploded to produce propellant gases, a re-usable removable driving piston having at least a portion of polygonal cross section for gas sealing engagement with the bore of said barrel, said bore having a polygonal cross section adapted to receive and guide the legs of a bifurcated staple in diagonally opposite corners of the bore to prevent rotation of the staple with respect to the bore, said driving piston being formed with a concave forward face substantially matching and supporting without deformation the curvature of the head portion of the bifurcated staple while transmitting the force of the propellant gases in the barrel to the staple as the piston and staple are accelerated through the bore under the action of the explosive cartridge.

2. A tool as defined in claim 1, said driving piston being formed so that opposite end portions thereof have spaced guiding engagement with the bore of the barrel and are integrally joined to each other by a necked-down weight-reducing portion of reduced cross-sectional area.

3. A tool as defined in claim 2, the rearward one only of said ends of the driving piston being formed to have gas sealing engagement with the bore of said barrel, the forward end of said driving piston being formed to have guiding engagement with symmetrically disposed spaced areas on the sides of the polygonal bore of said barrel and free from contact with the corners of the bore of the barrel.

4. A tool as defined in claim 3, said barrel being provided with detent means adjacent the muzzle thereof intersecting one of the corners of the polygonal bore to intercept and releasably retain within the barrel the rearward end of said driving piston as the tool is lifted away from a work surface after driving a staple thereinto.

5. A tool as defined in claim 1, said bore of polygonal cross section having such dimensions relative to said fastening device as to frictionally engage and yieldably support said fastening device at any desired position longitudinally of the barrel by engagement of the fastening device between the corners of the bore.

6. A tool as defined in claim 5, said barrel having a bore of square cross section having such a diagonal dimension as to receive and frictionally hold the legs of a bifurcated staple fastening device in diagonally opposite corners of the bore.

7. An explosive-actuated tool for projecting staple-type fastener projectile devices having at their forward ends a plurality of penetrative points and provided with an irregular transverse cross section, said tool comprising a barrel member having a bore of substantially greater transverse cross section than the transverse cross section of multi-point fastener projectiles to be used therein and a breech end in which an explosive cartridge is exploded to produce propellant gases, guide means in the bore positively engaging fastener devices inserted therein to prevent rotation of projected fastener projectile devices with respect to the bore and frictionally engaging fastener devices inserted therein to selectively support and position the fastener projectile devices at desired locations along the bore prior to projection, a separate detachable piston element for the tool with a transverse cross section closely fitting the transverse cross section of the said bore and having a forward end surface contoured to engage evenly the rear portion of a fastener projectile device for transmitting the forces of the propellant gases to the fastener projectile without deformation of said fastener projectile as both the piston element and abutting fastener projectile device are accelerated together through the bore and against a work surface adjacent the muzzle of the bore.

8. An explosive-actuated tool comprising a barrel member, said barrel member having a bore therethrough for projecting therefrom into a work surface fastener projectile devices of the type having a plurality of penetrative points and an irregular transverse cross section, said barrel having a breech end in which an explosive cartridge is exploded to produce propellant gases and a muzzle end positioned at the forward portion of the tool, said bore of the barrel having a transverse cross section substantially greater than the transverse cross section of fastener projectile devices used therein, said bore being provided with axially disposed guide means positively engaging fastener projectile devices inserted therein to prevent rotation of the fastener projectile devices with respect to said bore, said guide means also frictionally engaging and supporting fastener projectile devices inserted in the bore to selectively position the fastener projectile devices at desired locations along the bore prior to projection, a separate movable piston element slidably positioned in the bore and having a transverse cross section closely fitting the transverse cross section of the bore, said piston element provided at its forward end with a surface contoured to fit and support evenly the rear portion of a fastener projectile device without deformation thereof for transmitting the force of the propellant gases to the fastener projectile device as the piston element and abutting fastener projectile device are accelerated together through the bore, a detent catch means positioned at the muzzle end of the said barrel and intersecting a portion of the path of said piston to retain said piston element in the barrel while permitting exit of the fastener projectile into a work surface.

9. An explosive-actuated tool comprising a barrel member, said barrel member having a bore therethrough for projecting therefrom into a work surface fastener projectile devices of the type having a plurality of penetrative points and an irregular transverse cross section, said barrel having a breech end in which an explosive cartridge is fired to produce propellant gases and a muzzle end positioned at the forward portion of the tool, said bore of the barrel having a transverse cross section substantially greater than the transverse cross section of fastener projectile devices used therein, said bore being provided with axially disposed guide means positively engaging fastener projectile devices inserted therein to prevent rotation of the fastener projectile devices with respect to said bore, said guide means also frictionally engaging fastener projectile devices inserted in the bore to selectively position and support the fastener projectile devices at desired locations along the bore prior to projection, a separate movable piston element slidably positioned in the bore and having a transverse cross section closely fitting the transverse cross section of the bore, said piston element being provided at its forward end with a surface contoured to fit and support evenly the rear portion of a fastener projectile device without deformation thereof for transmitting the force of the propellant gases to the fastener projectile device as the piston element and abutting fastener projectile device are accelerated together through the bore, a detent catch means positioned at the muzzle end of the said barrel and intersecting a portion of said bore to retain said piston element in the barrel while permitting exit of the fastener projectile into a work surface, said bore at its muzzle end being provided with a portion of enlarged transverse cross section which permits the propellant gases to escape around the piston element while maintaining alignment of the fastener projectile device in guided relationship with respect to the bore.

References Cited in the file of this patent

UNITED STATES PATENTS

| | | |
|---|---|---|
| 926,287 | Reynolds | June 29, 1909 |
| 1,274,234 | Bernard | July 30, 1928 |
| 2,008,362 | Littlehale | July 16, 1935 |
| 2,518,395 | Sopris | Aug. 8, 1950 |
| 2,632,890 | Tietig | Mar. 31, 1953 |
| 2,724,116 | Termet | Nov. 22, 1955 |

FOREIGN PATENTS

| | | |
|---|---|---|
| 418 | Great Britain | May 15, 1718 |
| 49,259 | Netherlands | Sept. 16, 1940 |
| 472,022 | Italy | June 4, 1952 |
| 606,951 | France | Mar. 20, 1926 |